United States Patent
Lindner et al.

(10) Patent No.: US 10,221,281 B2
(45) Date of Patent: Mar. 5, 2019

(54) PROCESS FOR PREPARING POLYMERIC, IONIC IMIDAZOLIUM COMPOUNDS OF HIGH MOLECULAR WEIGHT

(71) Applicant: BASF SE, Ludwigshafen (DE)

(72) Inventors: Jean-Pierre Berkan Lindner, Mannheim (DE); Rupert Konradi, Ladenburg (DE); Till Gruendling, Mannheim (DE); Sunghee Son, Mannheim (DE); Sebastian Koltzenburg, Neustadt (DE)

(73) Assignee: BASF SE, Ludwigshafen (DE)

( * ) Notice: Subject to any disclaimer, the term of this patent is extended or adjusted under 35 U.S.C. 154(b) by 20 days.

(21) Appl. No.: 15/501,657

(22) PCT Filed: Jul. 27, 2015

(86) PCT No.: PCT/EP2015/067101
§ 371 (c)(1),
(2) Date: Feb. 3, 2017

(87) PCT Pub. No.: WO2016/020214
PCT Pub. Date: Feb. 11, 2016

(65) Prior Publication Data
US 2017/0226289 A1    Aug. 10, 2017

(30) Foreign Application Priority Data

Aug. 6, 2014   (EP) .................................... 14180070

(51) Int. Cl.
*C08G 12/06*     (2006.01)
*C08G 73/06*     (2006.01)
*C08G 73/00*     (2006.01)

(52) U.S. Cl.
CPC ......... *C08G 73/0616* (2013.01); *C08G 12/06* (2013.01)

(58) Field of Classification Search
CPC ........................................................ C08G 12/06
USPC ................................................... 528/245, 269
See application file for complete search history.

(56) References Cited

U.S. PATENT DOCUMENTS

| 8,791,271 B2 * | 7/2014 | Siemer | .................. C08G 12/06 528/245 |
| 2010/0249432 A1 | 9/2010 | Siemer et al. | |
| 2011/0263810 A1 | 10/2011 | Siemer et al. | |

FOREIGN PATENT DOCUMENTS

| WO | WO 99/37276 A1 | 7/1999 |
| WO | WO 2010/072571 A1 | 7/2010 |
| WO | WO 2016/020214 A1 | 2/2016 |

OTHER PUBLICATIONS

U.S. Appl. No. 15/501,365, claims filed Feb. 2017.*
International Search Report and Written Opinion dated Sep. 23, 2015 in PCT/EP2015/067101.
International Preliminary Report on Patentability and Written Opinion dated Feb. 16, 2017 in PCT/EP2015/067101.

* cited by examiner

*Primary Examiner* — Duc Truong
(74) *Attorney, Agent, or Firm* — Oblon, McClelland, Maier & Neustadt, L.L.P.

(57) ABSTRACT

A process for preparing polymeric, ionic compounds comprising imidazolium groups (polymeric, ionic imidazolium compounds for short) comprising reacting—an α-dicarbonyl compound,—an aldehyde,—at least one amino compound having at least two primary amino groups (referred to as oligoamine),—if appropriate an amino compound having only one primary amino group (referred to as monoamine) and a—protic acid, wherein the molar ratio of the α-dicarbonyl compound to the oligoamine is greater than 1.

14 Claims, No Drawings

PROCESS FOR PREPARING POLYMERIC, IONIC IMIDAZOLIUM COMPOUNDS OF HIGH MOLECULAR WEIGHT

The invention relates to a process for preparing polymeric, ionic compounds comprising imidazolium groups (polymeric, ionic imidazolium compounds for short) comprising reacting
an α-dicarbonyl compound,
an aldehyde,
at least one amino compound having at least two primary amino groups (referred to as oligoamine),
if appropriate an amino compound having only one primary amino group (referred to as monoamine) and a protic acid,
wherein the molar ratio of the α-dicarbonyl compound to the oligoamine is greater than 1.

Polymeric imidazolium compounds and processes for preparing them are described for example in WO 99/37276. According to WO 99/37276 polymeric imidazolium compounds are obtained by reaction compounds having two imidazole groups with dibromo compounds. The cationic imidazolium polymers obtained have bromide anions as counterion.

From WO 2010/072571 a new process for preparing polymeric imidazolium compounds is known. According to WO 2010/072571 an α-dicarbonyl compound, an aldehyde, a diamine and a protic acid are reacted. In only one reaction step both, the imidazolium ring system and the polymeric imidazolium is obtained from such starting materials.

The process of WO 2010/072571 still requires further improvements. In particular it is desired to obtain a polymeric imidazolium compound of high molecular weight as easily and efficiently as possible. Furthermore it is desired to avoid by-products and/or solids precipitating from the reaction mixture during or after the reaction. Such precipitates would render a production process on commercial scale problematic.

It was an object of the present invention to improve the process of WO 2010/072571. In particular an improved process should make polymeric imidazolium compound of high molecular easily accessible and avoid by-products or precipitates.

Accordingly the process as defined above has been found.

To the starting compounds for the process

According to the invention, an α-dicarbonyl compound, an aldehyde, at least one oligoamine and a protic acid are reacted with one another.

The carbonyl groups of the α-dicarbonyl compound and the aldehyde may have also the form of a hemiacetal, acetal, hemiketal or ketal group.

The reaction is a polycondensation. In a polycondensation polymerization occurs with elimination of a low molecular weight compound such as water or alcohol.

In the present case, water is eliminated in case of carbonyl groups. To the extent the carbonyl groups have the form of a ketal or hemiketal, acetal or hemiacetal group, an alcohol is eliminated instead of water.

In a preferred embodiment of the present invention the carbonyl groups are present as such and do not have the form of a hemiacetal, acetal, hemiketal or ketal group.

The term α-dicarbonyl compound, aldehyde, oligoamine, monoamine or protic acid as used herein includes a mixture of various-dicarbonyl compounds, various aldehydes, various oligoamines, various monoamines or various protic acids.

To the α-dicarbonyl compound

The α-dicarbonyl compound is preferably a compound of the formula I

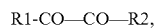

R1-CO—CO—R2, where R1 and R2 are each, independently of one another, an H atom or an organic radical having from 1 to 20 carbon atoms. The radicals can be branched or unbranched or comprise functional groups which can, for example, contribute to further crosslinking of the polymeric imidazolium compound. In particular, R1 and R2 are hydrocarbon radicals having the indicated number of carbon atoms.

The compound is particularly preferably glyoxal.

To the aldehyde

For the purposes of the present invention, an aldehyde is a compound having at least one aldehyde group. The aldehyde is in particular an aldehyde of the formula II

R3-CHO, where R3 is an H atom or an organic radical having from 1 to 20 carbon atoms. Particular preference is given to formaldehyde; the formaldehyde can also be used in the form of compounds which liberate formaldehyde, e.g. paraformaldehyde or trioxane.

To the oligoamine

The oligoamine may preferably be represented by the general formula III

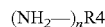

(NH$_2$—)$_n$R4 where n is an integer greater than or equal to 2 and indicates the number of amino groups. n can assume very large values, e.g. n can be an integer from 2 to 10 000, in particular from 2 to 5000. Very high values of n are present, for example, when polyamines such as polyvinylamine are used.

When compounds having n=2 (diamines) are used in the reaction according to the invention, linear, polymeric imidazolium compounds are formed, while in the case of amines having more than two primary amino groups, branched polymers are formed.

In a preferred embodiment, n is an integer from 2 to 6, in particular from 2 to 4. Very particular preference is given to n=2 (diamine) or n=3 (triamine). Very particular preference is given to n=2.

R4 is any n-valent organic radical. The n-valent organic radical can be the radical of a polymer, e.g. a polyvinylamine as mentioned above, and then has a correspondingly high molecular weight.

The organic radical can comprise not only carbon and hydrogen but also heteroatoms such as oxygen, nitrogen, sulfur or halogens, e.g. in the form of functional groups such as hydroxyl groups, ether groups, ester groups, amide groups, aromatic heterocycles, keto groups, aldehyde groups, primary or secondary amino groups, imino groups, thioether groups or halide groups.

In a preferred embodiment, the amino compound may comprise ether groups, secondary or tertiary amino groups and apart from these no further functional groups. Mention may be made of, for example, polyether amines.

R4 is most preferably a pure hydrocarbon radical or a hydrocarbon radical interrupted or substituted by ether groups, secondary amino groups or tertiary amino groups. In a particular embodiment, R$^4$ is a pure hydrocarbon radical and does not comprise any functional groups.

The hydrocarbon radical can be aliphatic or aromatic or comprise both aromatic and aliphatic groups.

Oligoamines may for example be diamines, in which the primary amino groups are bound directly to an aliphatic group, an aromatic ring system, e.g. a phenylene or naphthylene group, or amino compounds in which the primary amino groups are bound to aliphatic groups as alkyl substituents of an aromatic ring system.

Particularly preferred oligoamines are diamines, in which the primary amino groups are bound to an aliphatic hydrocarbon radical, preferably an aliphatic hydrocarbon radical having from 2 to 50 carbon atoms, particularly preferably from 3 to 40 carbon atoms.

Diamines which may be mentioned are, in particular, C2-C20-alkylenediamines such as 1,4-butylenediamine or 1,6-hexylenediamine.

To other starting materials

In the process of the invention, it is possible to use further compounds, e.g. in order to introduce specific end groups into the polymer or bring about additional crosslinking by means of further functional groups, to set defined properties or to make further reactions on the resulting polymer (polymer-analogous reactions) at a later point in time possible.

Thus, if desired, it is possible to use, for example, monoamines in order to influence the molecular weight of the polymeric imidazolium compounds. The compound having only one primary amino group leads to chain termination and then forms the end group of the polymer chain concerned. The higher the proportion of the monoamine, the lower is the molecular weight.

To the protic acid

The protic acid may be represented by the formula $Y^{m-}(H^+)_m$, where m is a positive integer. It can also be a polymeric protic acid, e.g. polyacrylic acid; in this case, m can assume very high values. As such polymeric protic acids, mention may be made of, for example, polyacrylic acid, polymethacrylic acid or a copolymer of (meth)acrylic acid, maleic acid, fumaric acid or itaconic acid with any other monomers, e.g. with (meth)acrylates, vinyl esters or aromatic monomers such as styrene, or another polymer having a plurality of carboxyl groups.

In a preferred embodiment, m is an integer from 1 to 4, particularly preferably 1 or 2. In a particular embodiment, m is 1.

The anion $Y^{m-}$ of the protic acid forms the counterion to the imidazolium cations of the polymeric imidazolium compound.

The anion of a protic acid is preferably the anion of a protic acid having a $pK_a$ of at least 1, in particular at least 2 and in a very particularly preferred embodiment at least 4 (measured at 25° C., 1 bar, in water or dimethyl sulfoxide).

The $pK_a$ is the negative logarithm to the base 10 of the acid constant, $K_a$.

The $pK_a$ is for this purpose measured at 25° C., 1 bar, either in water or dimethyl sulfoxide as solvent; it is therefore sufficient, according to the invention, for an anion to have the corresponding $pK_a$ either in water or in dimethyl sulfoxide. Dimethyl sulfoxide is used particularly when the anion is not readily soluble in water. Information on the two solvents may be found in standard reference works.

The protic acid is therefore preferably not a protic acid of the halogens which have a $pK_a$ of less than 1; in particular, it is not HCl and not HBr and the anion is correspondingly not chloride or bromide.

Preferred protic acids are carboxylic acids, sulfonic acids, phosphoric acids or phosphonic acids.

As phosphoric acid mention may be made of, in particular, compounds of the formula IV

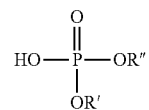

where R' and R" are each, independently of one another, hydrogen or a C1-C10-, preferably C1-C4-alkyl group.

As phosphonic acid mention may be made of, in particular, compounds of the formula V

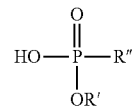

where R' and R" are each, independently of one another, hydrogen or a C1-C10-, preferably C1-C4-alkyl group.

Preferably, the protic acid is a carboxylic acid with one or more, in particular with one to three carboxylic acid groups; most preferred are carboxylic acids with one carboxylic acid group.

Preferred carboxylic acids have from 1 to 20 carbon atoms and comprise one or two carboxylic acid groups.

The carboxylic acids may be aliphatic or aromatic compounds. Here, aromatic compounds are compounds comprising aromatic groups. Particular preference is given to aliphatic or aromatic carboxylic acids which apart from the oxygen atoms of the carboxylic acid groups group comprise no further heteroatoms or at most comprise one or two hydroxyl groups, carbonyl groups or ether groups.

Most preferred are aliphatic or aromatic carboxylic acids which comprise no further heteroatoms in addition to the oxygen atoms of the carboxylic acid group.

As carboxylic acid having two carboxylic acid groups for example phthalic acid, isophthalic acid, of C2-C6-dicarboxylic acids, e.g. oxalic acid, malonic acid, succinic acid, glutaric acid, adipic acid may be mentioned.

As carboxylic acid having one carboxylic acid group, mention may be made of aliphatic, aromatic, saturated or unsaturated C1-C20-carboxylic acids, in particular alkanecarboxylic acids, alkenecarboxylic acids, alkynecarboxylic acids, alkadienecarboxylic acids, alkatrienecarboxylic acids, hydroxycarboxylic acids or ketonecarboxylic acids or aromatic carboxylic acids such as benzoic acid or phenylacetic acid. Suitable alkanecarboxylic acids, alkenecarboxylic acids and alkadienecarboxylic acids are also known as fatty acids.

Examples are benzoic acid and C1-C20-alkanecarboxylic acids, which may optionally be substituted by one or two hydroxy groups, preferably one hydroxy group.

Particular preference given to the benzoic acid and C2-C20-alkanecarboxylic acids, in particular the acetic acid and propionic acid, with very particular preference being given to acetic acid.

To the process

The reaction proceeds in principle according to the following reaction equation.

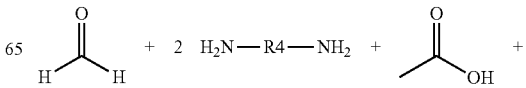

-continued

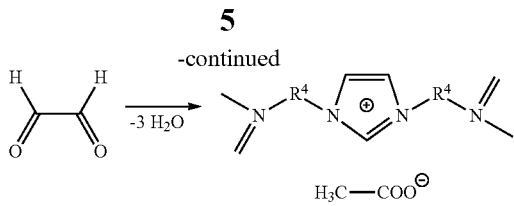

Here, 1 mol of aldehyde, 1 mol of a diamine, 1 mol of the protic acid and 1 mol of the α-dicarbonyl compound are used. In the polymer obtained, the imidazolium groups are joined to one another by the diamine.

High molecular weights should be achieved when the compounds are used in equimolar amounts.

It has been found, however, that the formation of polymeric, ionic imidazolium compounds of high molecular weight is improved with a molar ratio of the α-dicarbonyl compound to the oligoamine of greater than 1; hence a molar excess of the α-dicarbonyl compound is used.

In a preferred embodiment the molar ratio the of α-dicarbonyl compound to the oligoamine is from 1.001:1 to 2:1, more preferred is a ratio of 1.01:1 to 1.5:1.0; particularly preferred is a ratio of the of α-dicarbonyl compound to the oligoamine of 1.01:1 to 1.2:1.0.

It is preferred that the aldehyde is used in molar excess as well, the molar ratio of the aldehyde to the oligoamine being greater than 1 as well.

In a preferred embodiment the molar ratio the of the aldehyde to the oligoamine is from 1.001:1 to 2:1, more preferred is a ratio of 1.01:1 to 1.5:1.0; particularly preferred is a ratio of the aldehyde to the oligoamine of 1.01:1 to 1.2:1.0.

The reaction of the starting compounds is preferably carried out in water, a water-miscible solvent or mixtures thereof.

Water-miscible solvents are, in particular, protic solvents, preferably aliphatic alcohols or ethers having not more than 4 carbon atoms, e.g. methanol, ethanol, methyl ethyl ether, tetrahydrofuran. Suitable protic solvents are miscible with water in any ratio (at 1 bar, 21° C.).

The reaction is preferably carried out in water or mixtures of water with the above protic solvents. The reaction is particularly preferably carried out in water.

During the reaction the pH value is preferably 1 to 7, more preferably 1 to 6 and in particular 3 to 5. The pH value may be kept or adjusted by any suitable manner, for example by adding acids or suitable puffer systems. In a preferred embodiment an excess of the protic acid which is used as starting material may be used to adjust the pH value.

In a preferred embodiment the molar ratio of the protic acid to the oligoamine may be from 1.05:1 to 10:1, in particular from 1.2:1 to 5:1, respectively 1.5:1 to 5:1.

The starting components can be combined in any order.

The reaction of the starting components can be carried out at, for example, pressures of from 0.1 to 10 bar, in particular atmospheric pressure, and, for example, at temperatures below 100° C., in particular below 50° C., particularly preferably below 40° C., respectively 30° C. The reaction is exothermic and cooling is required. In order to avoid freezing the temperature should preferably not be lower than 0° C., in particular not be lower than 3° C. (at normal pressure). After the exothermic reaction the temperature may be raised and the reaction mixture may be stirred and kept at a higher temperature to complete the reaction.

The reaction can be carried out batchwise, semicontinuously or continuously. In the semicontinuous mode of operation, it is possible, for example, for at least one starting compound to be initially charged and the other starting components to be metered in.

In the continuous mode of operation, the starting components are combined continuously and the product mixture is discharged continuously. The starting components can be fed in either individually or as a mixture of all or part of the starting components. In a particular embodiment, the amine and the acid are mixed beforehand and fed in as one stream, while the other components can be fed in either individually or likewise as a mixture (2nd stream).

In a further particular embodiment of a continuous process all starting components comprising carbonyl groups (i.e. the α-dicarbonyl compound, the aldehyde and the protic acid of the anion X (if the latter is a carboxylate) are mixed beforehand and fed in together as a stream; the remaining amino compound is then fed in separately.

The continuous preparation can be carried out in any reaction vessels, i.e. in a stirred vessel. It is preferably carried out in a cascade of stirred vessels, e.g. from 2 to 4 stirred vessels, or in a tube reactor.

In a preferred embodiment of a batchwise process the protic acid is placed in the reactor first and the oligoamine, aldehyde and α-dicarbonyl compound are fed to the protic acid in a rate that the temperature of the reaction mixture is kept below 40° C., respectively 30° C. With such procedure the formation of any precipitates during the reaction is essentially avoided.

After the polycondensation reaction has been carried out, the polymeric compounds obtained can precipitate from the solution or remain in solution. Preferably solutions of the polymeric ionic imidazolium compounds are obtained.

The polymeric compounds can also be separated off from the solutions by customary methods. In the simplest case, the solvent, e.g. water, can be removed by distillation or by spray drying.

The number average molecular weight Mn of the polymeric, ionic imidazolium compounds obtained by the process is higher than by the process according to WO 2010/072571.

Mn may be for example greater than 20.000, in particular greater than 30.000, respectively greater than 50.000 g/mol. In general Mn will not be higher than 500.000 g/mol.

The polydispersity (ratio of weight average molecular weight and number average molecular weight Mw/Mn) may have, for example, values of from 1.1 to 100, in particular from 1.5 to 20.

The molecular weight is determined by Size-exclusion chromatographie (SEZ) using polymaltotriose as standard and water comprising 0.02 mol/l formic acid and 0.2 mol/l KCl as effluent at a temperature of 35° C. of the column.

The process of the invention is an easy and cost-effective process to obtain high molecular weight polymeric compounds comprising imidazolium groups. In addition, the process has high selectivity regarding such polymeric compounds. A precipitation of solids from the reaction mixture during or after the reaction can be avoided.

EXAMPLES

The molecular weight of the polymeric ionic compounds was determined by Size-exclusion chromatographie (SEZ) using polymaltotriose as standard and water comprising 0.02 mol/l formic acid and 0.2 mol/l KCl as effluent. The temperature of the column was 35° C., the injected volume 100 μL (μliter), the concentration 1.5 mg/mL and the flow rate 0.8 mL/min.

The weight average molecular weight (Mw), the number average molecular weight (Mn) and the polydispersity PDI (Mw/Mn) of the polymeric ionic compounds obtained are listed in the table.

Example 1

2 mol acetic acid are placed in a flask. A mixture of 1.05 mol formaldehyde (49% aq. Solution) and 1.05 mol glyoxal (40% aq. Solution) are added via a dropping funnel to the solution. In parallel, 1 mol of molten hexamethylene diamine (~40° C.) is added to the solution via a separated dropping funnel. During addition of the monomers the reaction mixture is held at room temperature by ice bath cooling. After completion of the addition the reaction mixture is heated to 100° C. for 1-3 hours. An aqueous solution of the polymeric, ionic imidazolium compound is obtained, which was analyzed. No precipitates have been observed during or after the reaction.

Comparison Example 1

1 mol formaldehyde (49% aq. Solution), 1 mol glyoxal (40% aq. Solution) and 1 mol acetic dissolved in 4.5 mol water acid are placed in flask. 1 mol of 1,4 diaminobutane (dissolved in 6.7 mol water) is added at room temperature (ice bath cooling) to the reaction mixture. A white precipitate occurs during the addition, which dissolves again upon continued addition of the monomer. The reaction is stirred at 100° C. for 1-3 hours. An aqueous solution of the polymeric, ionic imidazolium compound is obtained, which was analyzed.

Comparison Example 2

1 mol acetic acid dissolved in 4.5 mol water is placed in a flask. A mixture of 1 mol formaldehyde (49% aq. Solution) and 1 mol glyoxal (40% aq. Solution) is added via a dropping funnel to the solution. In parallel, 1 mol of 1,4 diaminobutane (dissolved in 6.7 mol water) is added to the solution via a separated dropping funnel. During addition of the monomers the reaction mixture is held at room temperature by ice bath cooling, no precipitate is observed. After completion of the addition the reaction mixture is heated to 100° C. for 1-3 hours. No precipitates have been observed during or after the reaction. An aqueous solution of the polymeric, ionic imidazolium compound is obtained, which was analyzed.

Comparison Example 3

The procedure of example 1 has been repeated using 1 mol formaldehyde and 1 mol glyoxal. No precipitates have been observed during or after the reaction.

TABLE performance details and results of example 1 and comparison examples 1-3

| No. | Diamine | Formaldehyde | Glyoxal | Acetic acid | Mw | Mn | PDI |
|---|---|---|---|---|---|---|---|
| comparison example 1 | 1 mol 1,4-diaminobutane | 1 mol | 1 mol | 1 mol | 7870 | 2860 | 2.8 |
| comparison example 2 | 1 mol 1,4-diaminobutane | 1 mol | 1 mol | 1 mol | 5930 | 2300 | 2.6 |
| comparison example 3 | 1 mol hexamethylenediamin | 1 mol | 1 mol | 2 mol | 78670 | 26430 | 3.0 |
| example 1 | 1 mol hexamethylenediamin | 1.05 mol | 1.05 mol | 2 mol | 278800 | 35330 | 7.9 |

The invention claimed is:

1. A process for preparing a polymeric, ionic compound comprising an imidazolium
    group, the process comprising reacting:
        an α-dicarbonyl compound,
        an aldehyde,
        a diamine of formula III:

$(NH_2—)_nR_4$,

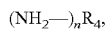

wherein n is 2 and $R_4$ is any n-valent organic radical,
        if appropriate, a monoamine, an amino compound having only one primary amino group; and
        at least one protic acid,
    wherein the molar ratio of the α-dicarbonyl compound to the diamine is greater than 1 and the molar ratio of the aldehyde to the diamine is greater than 1.

2. The process according to claim 1, wherein the molar ratio the of α-dicarbonyl compound to the oligoamine is from 1.001:1 to 2:1.

3. The process according to claim 1, wherein the molar ratio of the aldehyde to the diamine is from 1.001:1 to 2 to 1.

4. The process according to claim 1, wherein the α-dicarbonyl compound is a compound of formula I

R1-CO—CO—R2

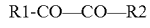

where R1 and R2 are each, independently of one another, an H atom or an organic radical having from 1 to 20 carbon atoms.

5. The process according to claim 1, wherein the aldehyde is an aldehyde of formula II

R3-CHO

where R3 is an H atom or an organic radical having from 1 to 20 carbon atoms.

6. The process according to claim 1, wherein the aldehyde is formaldehyde.

7. The process according to claim 1, wherein the diamine is an aliphatic or aromatic diamine.

8. The process according to claim 1, wherein the diamine is a C2-C20-alkylenediamine.

9. The process according to claim 1, wherein the at least one protic acid is an acid with a $pK_a$ greater than 1 measured at 25° C. at 1 bar in water or dimethyl sulfoxide.

10. The process according to claim 1, wherein the at least one protic acid is acetic acid.

11. The process according to claim 1, wherein the process is carried out in water, in a water-miscible solvent, or a mixture thereof.

12. The process according to claim 1, wherein the pH value of the reaction solution is from 1 to 6.

13. The process according to claim 1, wherein the molar ratio of the protic acid to the diamine is from 1.05:1 to 10:1.

14. The process according to claim 1, wherein the protic acid is placed in the reactor first and the diamine, aldehyde and α-dicarbonyl compound are fed to the protic acid in a rate that the temperature of the reaction mixture is kept below 30° C.

* * * * *